United States Patent
Pinarello et al.

(10) Patent No.: US 9,631,441 B2
(45) Date of Patent: Apr. 25, 2017

(54) TUBULAR APPARATUS FOR MAKING RIGID TUBULAR STRUCTURES, AND CORRESPONDING INSTALLATION METHOD

(71) Applicant: BLUETHINK S.P.A., Turin (IT)

(72) Inventors: Giordano Pinarello, Turin (IT); Alessandro Bailini, Turin (IT)

(73) Assignee: BLUETHINK S.P.A., Turin (IT)

( * ) Notice: Subject to any disclaimer, the term of this patent is extended or adjusted under 35 U.S.C. 154(b) by 351 days.

(21) Appl. No.: 14/350,276

(22) PCT Filed: Oct. 5, 2012

(86) PCT No.: PCT/IB2012/055377
§ 371 (c)(1),
(2) Date: Apr. 7, 2014

(87) PCT Pub. No.: WO2013/050976
PCT Pub. Date: Apr. 11, 2013

(65) Prior Publication Data
US 2014/0251638 A1    Sep. 11, 2014

(30) Foreign Application Priority Data
Oct. 7, 2011 (IT) ............... TO2011A0896

(51) Int. Cl.
*F16L 11/02* (2006.01)
*E21B 19/00* (2006.01)
*F16L 11/127* (2006.01)
*F16L 11/20* (2006.01)
(Continued)

(52) U.S. Cl.
CPC .............. *E21B 19/00* (2013.01); *E21B 17/20* (2013.01); *E21B 17/206* (2013.01);
(Continued)

(58) Field of Classification Search
CPC ............................. F16L 11/02; F16L 55/1656
(Continued)

(56) References Cited

U.S. PATENT DOCUMENTS 2,572,062 A    10/1951    Sexton
6,037,035 A *    3/2000    Bottger ................. B29C 70/228
                                                                428/116
(Continued)

FOREIGN PATENT DOCUMENTS

DE    20 2005 01845    1/2006
EP    0 481 772    4/1992
WO    WO 2006/070182    7/2006

OTHER PUBLICATIONS

International Search Report for PCT/IB2012/055377, mailed Jan. 2, 2013.
(Continued)

*Primary Examiner* — Patrick F Brinson
(74) *Attorney, Agent, or Firm* — Nixon & Vanderhye P.C.

(57) ABSTRACT

Described herein is a tubular apparatus for making rigid tubular structures, comprising a flexible cylindrical wall (11, 11') defining inside it a hollow passage (19), and suited for being wound, in particular on a spool, and continuously laid for use. According to the invention, said cylindrical wall (11, 11') comprises a fabric (12, 13, 15, 12', 13', 15') comprising inside it at least one gap (14;14'), which develops in the axial direction of said cylindrical wall (11, 11'), said fabric (12, 13, 15; 12', 13', 15') comprising means suitable for operating under traction (15, 15') when present within said at least one gap (14; 14') is a fluid (20), injected under pressure for stiffening the tubular apparatus (10; 10').

13 Claims, 3 Drawing Sheets

(51) Int. Cl.
*F16L 55/165* (2006.01)
*E21B 43/10* (2006.01)
*E21B 17/20* (2006.01)

(52) U.S. Cl.
CPC ............ *E21B 43/103* (2013.01); *F16L 11/02* (2013.01); *F16L 11/127* (2013.01); *F16L 11/20* (2013.01); *F16L 55/1652* (2013.01); *F16L 55/1656* (2013.01)

(58) Field of Classification Search
USPC .................... 138/98, 123–124; 264/511, 571
See application file for complete search history.

(56) References Cited

U.S. PATENT DOCUMENTS

| | | | |
|---|---|---|---|
| 6,688,338 B2* | 2/2004 | Meli | F16L 13/0272 138/123 |
| 7,048,985 B2* | 5/2006 | Mack | B29C 70/24 428/105 |
| 7,060,156 B2* | 6/2006 | Mack | B29C 70/24 156/161 |
| 7,891,381 B2* | 2/2011 | Anders | F16L 55/1651 138/97 |
| 2003/0102604 A1* | 6/2003 | Mack | B29C 70/24 264/511 |
| 2006/0151656 A1 | 7/2006 | Gallagher et al. | |
| 2007/0044859 A1 | 3/2007 | Peterson | |
| 2008/0277013 A1* | 11/2008 | Anders | F16L 55/1651 138/98 |

OTHER PUBLICATIONS

Written Opinion of the Isa for PCT/IB2012/055377, mailed Jan. 2, 2013.

* cited by examiner

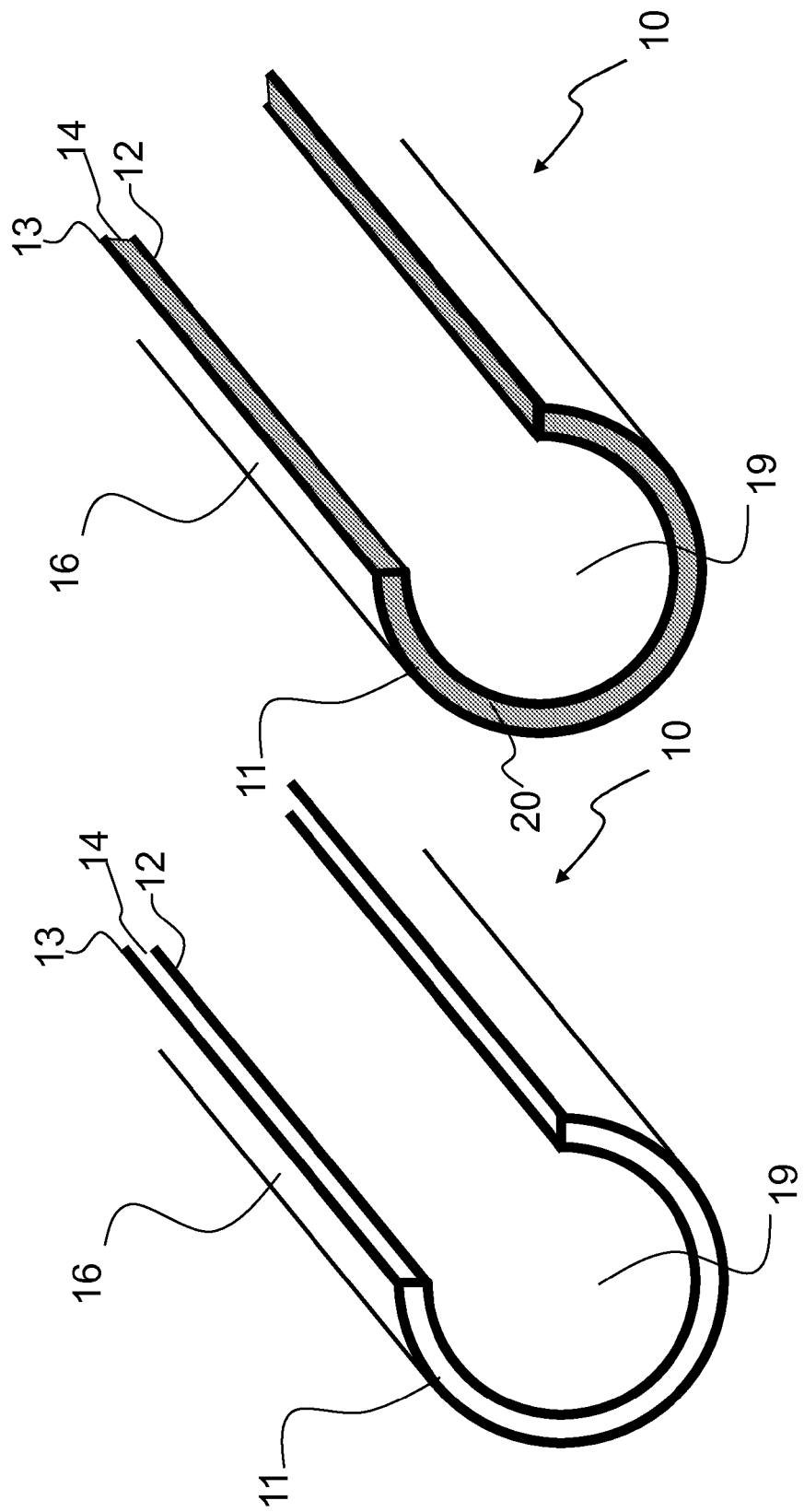

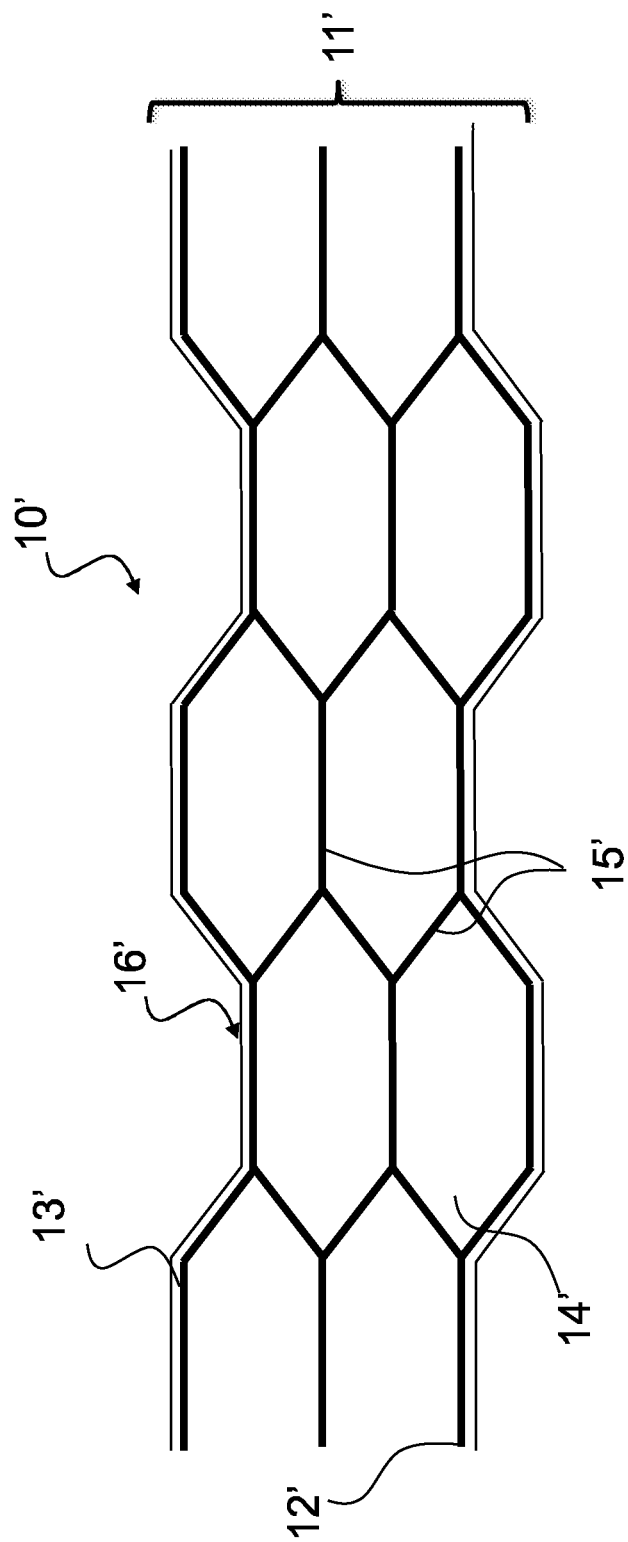

TUBULAR APPARATUS FOR MAKING RIGID TUBULAR STRUCTURES, AND CORRESPONDING INSTALLATION METHOD

This application is the U.S. national phase of International Application No. PCT/IB2012/055377 filed 5 Oct. 2012 which designated the U.S. and claims priority to IT Patent Application No. TO2011A000896 filed 7 Oct. 2011, the entire contents of each of which are hereby incorporated by reference.

The present invention relates to a tubular apparatus for making rigid tubular structures, comprising a flexible cylindrical wall defining inside it a hollow passage, and suitable for being wound, in particular on a spool, and continuously laid for use.

There are in general known tubing systems that are used in lines for conveying fluids. Said tubing systems usually consist of tubular elements made of steel or cement provided in discrete sections connected together via threaded joints, male-female couplings, and flanges.

Tubing of this sort implies, during installation, the presence of operators who carry out the operations of cleaning of the joints and checking of the integrity of the threads, fit, greasing, controlled tightening, and fluid tightness of the joint. Moreover, the presence of the lubricant in the joint prevents the use of the tubing as a conductor for carrying electric power and/or data.

It is known to use, in non-permanent applications, flexible tubing for conveying hydrocarbons which are made of polymeric material reinforced with steel or with high-performance fibres, which withstand pressures of the order of hundreds and thousands of bar.

For example, the document No. US2005/0183785 A1 describes a system consisting of a flexible tube made up of two layers of fibres arranged, wound in a spiral, between two polymer sheathes, which can be wound on a spool, used for conveying fluids.

This type of solution, based upon a flexible tube, presents the advantage of being installable, for example, laid, continuously, in particular unwound and lowered without any interruption, and of having an internal bursting pressure of 200 bar; however, it is not suited to being installed, for example, buried underground, permanently in contexts in which external mechanical stresses are present, for example due to variations in pressure or to the weight of the soil, which causes collapse of the walls of the tube, preventing passage of the fluid conveyed.

The object of the present invention is to provide a tubular apparatus, for making rigid tubular structures, which is flexible and hence suitable for being wound, in particular on a spool, and installed in a continuous way, and which can ensure a permanent installation that is able to withstand variations in both internal and external pressures of some hundreds of bar.

According to the present invention, said object is achieved thanks to a tubular apparatus, as well as to a corresponding laying method, having the characteristics recalled specifically in the annexed claims.

The invention will be described with reference to the annexed drawings, which are provided purely by way of non-limiting example and in which:

FIG. 1 is a principle diagram of a first embodiment of the tubular apparatus according to the invention in a first configuration of use;

FIG. 3 is a principle diagram of the tubular apparatus of FIG. 1 in a second configuration of use;

FIG. 5 is a schematic cross-sectional view of a second embodiment of the tubular apparatus according to the invention.

Figure 4:
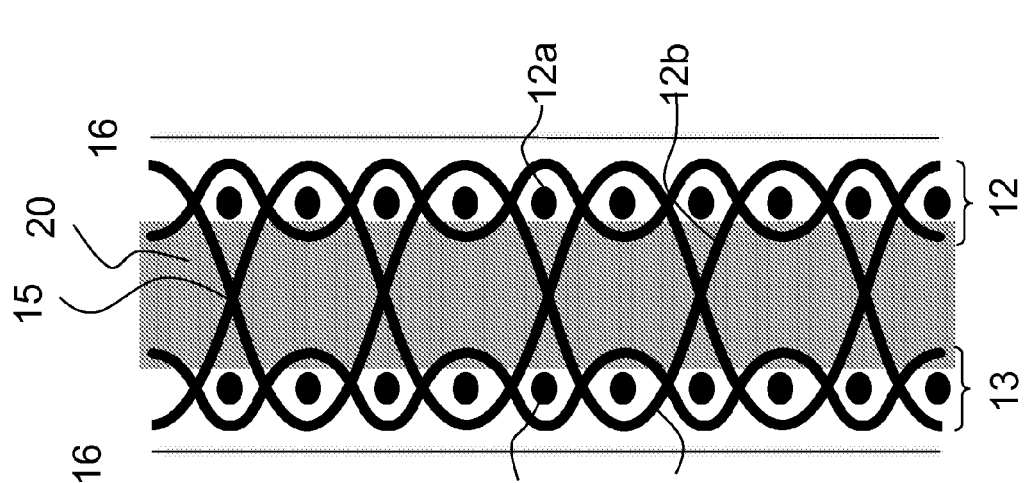
FIG. 4 is a schematic cross-sectional view of the detail of the tubular apparatus of FIG. 1 in a second configuration of use.

In brief, a tubular apparatus is proposed that can be installed or laid as a flexible object, via a specific configuration of the walls of the tubular apparatus. Said specific configuration envisages that the tubular apparatus, made via a tube with cylindrical wall made of fabric or interwoven fibres, identifies at least one gap in the axial direction of the tube. The gap comprises means for operating under traction in the structure of the wall when present within the gap is a pressurized fluid, i.e., a fluid such as to determine a resultant pressure from inside the gap outwards, injected for stiffening said tubular apparatus. In particular, the cylindrical wall defines, via the respective interwoven fibres, a three-dimensional structure, or three-dimensional fabric, comprising an outer wall, an inner wall, one or more gaps comprised between said outer and inner walls, and the means suitable for operating under traction.

By "three-dimensional structure" or "three-dimensional fabric" is meant in general a fabric comprising a first surface defined by the interwoven fibres and a second surface defined by the interwoven fibres, said first and second surfaces being set at a distance from one another such as to define a volume of space between them. Said space comprises interwoven fibres for defining one or more gaps, with a development principally in the axial direction of the tubular apparatus, and means suitable for operating under traction, in the form, for example, of threads or yarn or layers of fabric, arranged in said space for interconnecting the first and second surfaces. That is, the threads or yarn or layers of fabric extend continuously from the interwoven fibres of one surface to the interwoven fibres of the other surface. Hence, the threads or yarn or layers of fabric that traverse the gap and operate as means suitable for operating under traction are fibres that belong to the weave of both of said surfaces.

Represented in perspective in FIG. 1 is a tubular apparatus 10 according to the invention. Just one short segment of said tubular apparatus 10 is represented in FIG. 1, but in general said apparatus comprises a tube in the form of a closed hollow solid, which, in a resting condition, i.e., when it is not, for example, bent or squeezed, or as explained in detail in what follows, when a fluid is injected therein, has a cross section that is preferably constant in shape and area and extends for a length at least ten or one hundred times greater than its internal diameter. Said tubular apparatus 10 comprises a wall 11, substantially having the form of a wall of a cylinder and thus defining inside it a hollow passage 19, designed, for example, to allow passage of a flow in the axial direction of the tubular apparatus 10. Said wall 11 is flexible, made of a three-dimensional fabric of fibres that delimit at least one gap 14, which substantially also has the shape of a cylinder or cylindrical annulus developing in the axial direction of the tubular apparatus 10.

Figure 2:
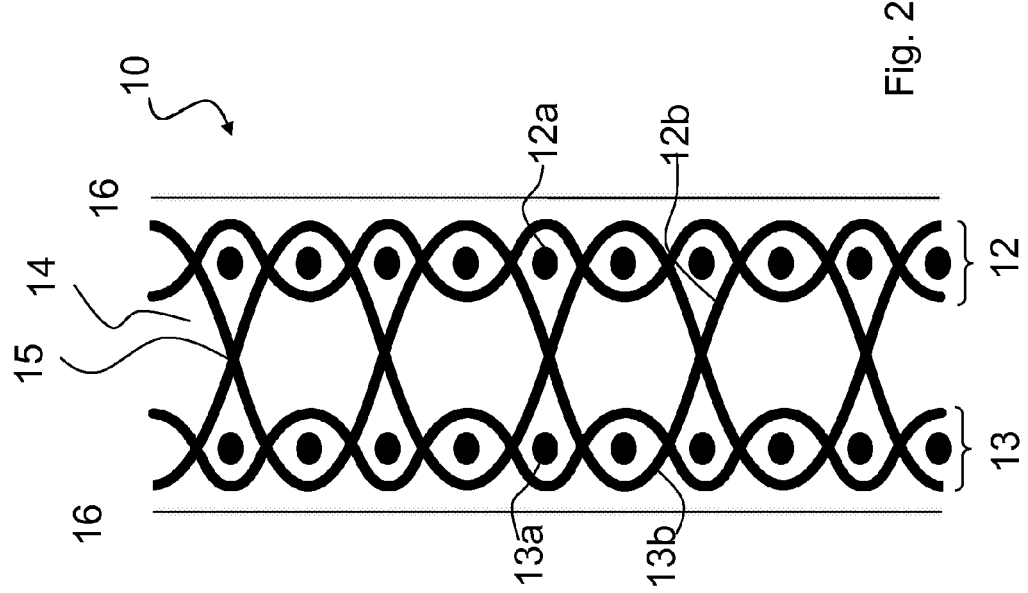
FIG. 2 is a schematic cross-sectional view of a detail of the tubular apparatus of FIG. 1.

A structure of this type can, for example, be obtained according to what is illustrated in the cross sections of FIGS. 2 and 4. FIGS. 2 and 4 show cross sections of the tubular apparatus 10, i.e., sections perpendicular to the longitudinal axis of said tubular apparatus 10. The portions of cross section of wall 11 of FIGS. 2 and 4 are in actual fact arcs of circumference, but are here represented straightened for simplicity, given the difference of dimensions between the overall diameter of the tubular apparatus 10 and the width of the gap 14, as described more fully in what follows.

Illustrated in FIG. 2 is a cross section of the wall 11, where there may be noted interconnection fibres 15 that join an inner wall 12 and an outer wall 13, passing through the gap 14. Also said interconnection fibres 15, as may be inferred from FIG. 2 and as is explained in detail hereinafter, are continuous fibres of the three-dimensional fabric; i.e., they are fibres belonging to the weave of the walls 12 and 13. The inner wall 12 faces inwards, i.e., it delimits the hollow passage 19 of the tubular apparatus 10 where the flow to be conveyed passes, whereas the outer wall 13 faces outwards, for example, towards the context of laying or burying in which the tubular apparatus 10 is inserted. The wall 11 of the tubular apparatus 10 is obtained via a fabric of fibres, the weave of which) develops in three dimensions. Illustrated in particular in FIG. 2 is a double interconnected layer, in which two parallel fibres identified by the respective warp threads 12a and 13a (or, respectively, weft threads) of the walls 12 and 13 form as many parallel layers of fabric set at a distance apart from one another, to delimit the gap 14. It is envisaged to use for the wall 11 fibres with high mechanical) performance under traction, for example, aramide fibres or carbon fibres. The interconnection fibres 15 correspond to some weft fibres 12b and 13b (or, respectively, warp fibres) of the parallel fabrics that constitute each layer or wall 12 and 13, which fibres intersect, constraining together the structures of the layers, i.e., the structures of the two walls 12 and 13. This consequently produces a three-dimensional fabric in which all the fibres work under traction in regard to injection of a fluid in the gap 14, for example, in regard to forces that tend to press the walls 12 and 13 apart and result from the pressure of the fluid, as will be explained in greater detail in what follows. This enables injection in the gap 14 of fluids at very high pressures with optimal distribution of the loads on the) structure.

Three-dimensional fabric structures of the type illustrated in FIG. 2 or FIG. 4 are produced, for example, by the company Pascha Velvet BVBA.

It is envisaged to impregnate the fibre of the inner wall 12 and the outer wall 13 with an impermeabilizing agent, in particular with a polymer, to obtain coatings 16 that guarantee fluid tightness for the fluids conveyed in the passage 19. For this purpose, fluorinated polymers may, for example, be used, which guarantee excellent chemical resistance to attack from many chemical agents.

The process of impregnation may, for example, be a process of impregnation, at high temperature, of the fabric of fibres with the polymer similar) to the one used for the production of the rubber composites reinforced with polyester fabric used in the production of membranes for pneumatic valves.

More in general, the tubular apparatus 10 for example comprises, as illustrated with reference to FIGS. 2 and 4, walls 12 and 13 obtained through a respective single layer of three-dimensional fabric, i.e., a layer of weft and warp threads, for instance, the surfaces of which facing the inside and the outside of the tubular apparatus 10 are rendered impermeable via surface treatments. The impermeabilization may be obtained also using one of the following treatments of the surfaces of the single layer:
  via deposition of an impermeable polymeric film (silicone, PTFE, or other fluorinated polymers) by means of plasma or thermal spraying;
  via spray coating of polymeric paints;
  by means of deposition by fusion of an impermeable polymeric film on the outer wall of the tubular apparatus 10, which enables coating of the entire surface of fabric that comes into contact with the external and internal environment of said tubular apparatus 10;
  by means of kiss-coating, slot-die, or other processes of roll-to-roll spreading of the surfaces of fabric in contact with the external and internal environments of the tubular apparatus 10 with fluorinated polymers (for example, Teflon®, Zonyl®).

It should be noted that in this way it is sufficient to treat the surface of the three-dimensional fabric, as compared, instead, to tubing of the prior art (not made of metal), which envisaged impermeabilization by gluing or superposition of one or more layers of impermeable material.

It is provided that, during installation or when installation is completed, the gap 14 is be filled with a pressurized fluid 20, at a pressure preferably higher than the pressure on the outside of the tubular apparatus 10 in the position of installation or laying, as illustrated in FIGS. 2 and 4, which show the tubular apparatus 10 in perspective view and the wall 11 in cross-sectional view. The tubular apparatus 10 behaves like a rigid object by virtue of the pressure of the fluid 20 injected.

The fluid may in general be a pressurized fluid, such as for example water, designed to give stiffness to the apparatus via pressurized injection.

However, according to a further aspect, the fluid 20 injected into the gap 14 may be a cement or a resin or some other material capable of solidifying; in this case, the tubular apparatus 10, once solidification has occurred, will to all effects be a rigid object made of composite material.

As regards the pressure values, in general for inflating a collapsed tubular element immersed in a fluid, which is a structure to which the tubular apparatus 10 can be likened when the fluid flows in the passage 19, at a pressure P, it is necessary to exert a pressure of inflation, or injection, P+$\Delta$P, where $\Delta$P is an overpressure necessary to compensate for the head losses within the tubular element. The tubular apparatus 10 is configured for being inflated by means of injection of a fluid into the gap between the walls of the fabric. Moreover, the tubular apparatus 10 is configured for being installed also at great depths, where the pressures of the fluid to be extracted are indicatively comprised between $10^2$ bar and $10^3$ bar.

In general, in a system such as the tubular apparatus 10, the overpressure $\Delta$P depends upon the viscosity of the injected fluid, upon the characteristics of the injection channel, i.e., upon the characteristics of the gap 14, and upon the length of the path that the injected fluid has to traverse.

Since the fibres of the three-dimensional fabric of the tubular apparatus 10 present a high tensile strength, they enable injection into the gap 14 of a viscous fluid, for example, an epoxy resin, the viscosity of which is comprised, for instance, in a range of between 100 and 500 mPa·s, with an overpressure $\Delta$P to compensate for the head losses that can reach up to 10-100 bar.

An epoxy resin with viscosity of 250 mPa·s may, for example, be injected, exerting a maximum overpressure of 100-200 bar for every 100 m of injection path, i.e., with a length of the tubular apparatus 10 depending upon the rheological characteristics of the fluid and the desired rate of injection.

Consequently, the tubular apparatus 10 is configured, via the cylindrical wall made of fabric that defines, via the respective interwoven fibres, a three-dimensional structure, and via the means suitable for operating under traction comprised in said structure, for withstanding a stress on the walls of the three-dimensional fabric, when a fluid injected under pressure for stiffening the tubular apparatus is present within the gap, with an overpressure $\Delta P$ that is, for example, higher than 10 bar. For instance, said overpressure $\Delta P$ that can be sustained may even be higher than 100 bar. Again for example, said overpressure $\Delta P$ that can be sustained may even be higher than 1000 bar.

Said overpressure $\Delta P$ that can be sustained by the apparatus 10 is preferably comprised between 100 and 200 bar.

It should be noted that the larger the number of interconnection threads between the walls, the greater the maximum overpressure that can be exerted in the gap; consequently, the tubular apparatus can be sized for withstanding higher pressures by working on said parameter.

The structure of the wall 11 may in general comprise a number n of layers of fabric that delimit n−1 concentric gaps 14, where n is an integer greater than or equal to one. In general, this can be obtained via the arrangement of a number of complete concentric walls 11 or via a wall having an outer wall, an inner wall, and a plurality of separating walls for identifying the various concentric gaps.

The structure of the wall 11 can be made with topologies of structure of the fabric that may even differ from the one illustrated by way of example in the present description but in which in any case the criss-crossing of the layers of fibres delimits one or more gaps in which the filler fluid 20 can be injected, for example, topologies of fabric with honeycombed cross section.

Illustrated in this connection in FIG. 5 is a variant embodiment of the tubular apparatus 10, designated by 10', in which a wall 11' delimits between its inner wall 12' and its outer wall 13', which are coated with impermeabilizing polymericlayers 16', a honeycomb structure of gaps 14' corresponding to the cells of the structure. The wall 11' is illustrated in cross-sectional view; consequently, also the gaps 14' develop in the axial direction of the tubular apparatus 10'. Separating walls 15' of the cells that determine the plurality of gaps 14' operate in this case at least in part as means operating under traction with respect to injection of a fluid into the gaps 14'.

The layers of fibres that delimit the gaps 14, including the inner wall 12 and the outer wall 13, as has been said, may present, on one or both of the faces, a coating of polymeric material. Said coating may be specialized for performing various functions, amongst which:

being impermeable to various substances, amongst which water, $CO_2$, $H_2S$, hydrocarbons, as well as to the components of the fluids 20 injected, while being soluble to some substances;
allowing selective passage of certain substances;
degrading at a set temperature or in set conditions; and
allowing passage of the fluids once a given pressure differential has been exceeded. The tubular apparatus 10 may be used in multilayer structures comprising layers of other materials that perform specific functions, for example, layers of fire-proofing or self-extinguishing material.

It is possible to exploit to advantage the characteristic of the tube according to the invention of enabling continuous installation, in particular continuous laying, or in any case installation or laying in stretches of hundreds of metres or kilometres and consequently with a very small number of joints, for integrating therein in a simple way systems for the transmission of energy and data, in addition to sensor systems.

The structure of the wall 11 can integrate cables for conveying electric power, laser beams, or signals for carrying data, for example, metal or optical-fibre cables.

The structure of the wall 11 can integrate sensors and sensor systems for checking the operating conditions of the tube; they may, for example, be sensors for detecting mechanical stress, deformation, failure, deterioration of the polymeric coating, pressure, temperature, etc.

The structure of the wall 11 may integrate sensors for analysis of the fluid conveyed, such as for example pressure sensors, temperature sensors, sensors for chemical composition, multi-phase flowmeters, sensors for detecting electrical properties, etc.

The method of installation, for example, laying, envisages that the gap 14 is initially empty; consequently, the tubular apparatus 10, which can be a continuous tube of the length desired and allowed by the properties of the fibre used, and hence even several hundreds of metres or kilometres, is flexible and can thus be wound on a spool, carried to the site where it is to be installed, unwound, placed, and positioned in a continuous way employing very simple installation processes.

The installation method that envisages laying in a well may involve, for example, applying a weight at the free end of the spooled tubular apparatus and lowering thereof by gravity into a well. The tubular apparatus 10 is stiffened, once the laying operation is completed, by injecting the fluid 20 into the gap 14.

The laying method may also be carried out applying, at the free end of the spooled tubular apparatus 10, a guide tube, which is lowered in parallel, for stiffening the tubular apparatus 10 during laying, and injecting the fluid 20 into the gap 14, to allow, for example, inspection of the integrity of the tubular apparatus 10 during its descent into the well.

Said laying methods refer, for example, to wells for water or other types of well sinking.

The tubular apparatus 10 according to the invention may be used for further different applications in the sectors of conveying and storage of fluids, as well as in the residential and industrial building industry, for example, for the production of ducts for carrying fluids, systems for repairing damaged pipes, rigid structures with the function of storage of fluids, and rigid cylindrical structural elements for residential and industrial applications.

In a first application, the tubular apparatus 10 can be used as lines for conveying fluids, such as for example water. This application is particularly indicated for those contexts in which continuous laying and absence of joints represents a factor of considerable technological advantage, such as for example submarine installations, installations on river beds, laying in wells for the extraction of water, or underground passageways. In such applications, it may be envisaged that since the tubular apparatus 10, in the absence of fluid 20 in the gap 14, is flexible, it may be squeezed until it assumes the form of a ribbon to allow more convenient transport thereof wound on a spool to the laying site, and hence enable easy laying thereof, by simply unwinding it off the spool. At the end of installation, the tubular apparatus 10 can be rendered rigid via injection of a pressurized fluid 20 into the gap 14. The fluid 20 in this application may, for example, be a bicomponent resin selected in such a way that its hardening time is much longer than the time necessary for laying the tubular apparatus, or a heat-hardening resin that is activated once the laying operation is completed, for example, by blowing a jet of hot gas into the tubular itself. In this type of application, the aforementioned tubular apparatus 10 may possibly be used, which comprises two concentric gaps, separated by a wall of impermeable fabric in which a resin and its hardener are injected separately, with a separating wall functionalized in such a way as to enable interchange of the fluids when a pre-set pressure or pre-set temperature is exceeded, or again because the impermeabilizing layer is soluble for one of the two fluids. In the application of the tubular apparatus 10 as line, it is possible to include, in the wall 11 of the tubular apparatus 10, cables for the transmission of electric power, laser beams, and signals.

According to a further application, the tubular apparatus 10 may be used as repair system for ducts designed to convey fluids, such as for example water, which have suffered damage such as leaks that jeopardize the integrity thereof. For this application, for instance, a stretch of tubular apparatus of the length of some metres is placed within the damaged conduit where a leak is present and is stiffened by injecting a fluid 20 into the gap 14. The tightness of the repair system is guaranteed, for example, by the fact that the pressure of the fluid 20 injected into the gap 14, which is higher than the pressure inside the line to be repaired, forces the outer wall 13 to adapt to the internal surface of the line to be repaired, and the polymeric coating 16 of the wall 13 hence performs the seal function. An alternative configuration of the tubular apparatus as repair system is represented by the previously described tubular apparatus in which the wall 11 envisages two concentric gaps separated by a wall of impermeable fabric. The outer gap contains a fluid, for example, a bicomponent epoxy resin, suited for repairing the leak, whilst the fluid 20 is injected into the inner gap. The outer wall 13 is functionalized to allow passage of the fluid contained in the outermost gap when a pressure differential that is set up is exceeded. The tubular apparatus is then located at the leak, and the fluid 20 is injected into the innermost gap at a pressure such as to cause outlet of the repair fluid in the proximity of the leak.

A further application can envisage use of said tubular apparatus to obtain rigid structures with the function of containment, for example, cylindrical tanks, using a tubular apparatus having an internal diameter according to the volume required. To obtain the containment structure, one end of the tube may be tapered and the other connected to a fastening system, for example, consisting of flanges, connectors, and hatches, which will enable communication between the inside and the outside of the containment structure. Said application, which may envisage transportation in the squeezed form, as described previously, or else in the form where the tube is folded on itself, enables installation of structures, such as for example tanks, in critical contexts, for instance in underground or underwater areas. In this context, the structure having a containment function may also house inside it instruments of a suitable shape that require protection from critical environmental conditions, like, for example, temperature, pressure, or the presence of aggressive substances. In this application, it is hence possible to obtain cylindrical structures rendered rigid after being laid in place by injecting the fluid 20 into the gap 14 in which there may be housed, for instance, electrical cables, optical fibres, and pipes of small dimensions for conveying water or technical gases.

The tubular apparatus can moreover be used to obtain rigid structures, such as for example cylindrical structural elements for use in residential or industrial structures. In this application, the possibility of obtaining structures of considerable length without joints constitutes a factor of great technological advantage, for example, for the construction of bridges or gangways in critical situations, characterized, for example, by the difficulty of providing traditional metal structures or by the need to obtain self-supporting structures of considerable length.

Hence, on the basis of what has been described so far, the solution according to the invention, as well as its advantages, emerges clearly.

The tubular apparatus according to the invention advantageously comprises a three-dimensional fabric, without any interruption or seams that might alter homogeneity thereof, which identifies two weft-thread and warp-thread walls connected together via filaments that belong to weft and warp themselves of the walls. Since the interconnections between the two walls, i.e., the means for operating under traction, consist of filaments belonging to the walls themselves, they enable, following upon application of a local or extensive stress, such as, for instance, the pressure of an injection fluid, a homogeneous distribution of the stresses that affects the entire volume of the fibres of the fabric, not only the area in direct contact with the point or area of application of the stress. Said particular structure of the three-dimensional fabric enables very high stresses to be withstood since their intensity is distributed over a wider area than the one affected directly by the stress, making not only the fibres of the wall on which the force acts to work, but distributing the force over the interconnections, which in turn distribute it over the opposite wall. Without being tied down to any specific theory in this connection, the foregoing can be interpreted as a manifestation of how the stresses are not concentrated in a small area of the tubular apparatus or of its walls, but rather the stress vector is decomposed into infinitesimal stress vectors that act on the infinitesimal surfaces into which the fabric may conceptually be divided.

The use of said three-dimensional fabric, with the structure and configuration referred to above moreover advantageously makes available a fabric provided with a gap between the two walls, the weft-thread wall and the warp-thread wall. Within the gap, as has been mentioned, there can be injected a fluid at very high pressure, even of the order of thousands or tens of thousands of psi. The fibres of the fabric, following upon injection of the injection fluid, are stressed substantially along their axis, since they are, for example, weft-thread fibres in common between parallel layers of warp fibres. Stressed in this way, said fibres present mechanical properties of very high tensile strength and are able to withstand the tensile stress that is exerted from the inside towards the outside of the gap, also thanks to the aforementioned distribution of this stress over the entire surface of the fibres.

Furthermore, advantageously the tubular apparatus according to the invention uses a three-dimensional fabric of fibres, such as for example aramide fibres, characterized by very high values of tensile strength (in the case of aramide fibres, for example, up to three times the tensile strength of steel).

The tubular apparatus according to the invention is particularly advantageous in operations of spoolable tubing, as compared, for example, to a tubing made of metal material, in so far as it can be wound and produced industrially in the lengths required: since it is a continuous tubular, no joints are necessary, and this enables integration within the gap of metal wires or optical fibres for conveying signals and/or power, to be lowered, for example, continuously in extraction wells that are even several kilometres deep.

In addition, advantageously the tubular apparatus according to the invention, via the injection of fluids at high pressure within the gap between the inner wall and the outer wall of the fabric of the tubular apparatus enables:

operating in pipelines in which fluids flow at equally high pressures without having to empty said pipelines;
  laying of the tube without having to control the pressure inside it; it is, in fact, sufficient to reach an overpressure in the gap, without regulating the pressure in the internal passage, due to swelling of the tubular apparatus;

temporary stiffening of the tube merely as a result of the pressure in the gap for carrying out checks on integrity, for temporary laying, and for inducing the tubular to follow complex shapes of the conduit that it has to reinforce or repair; and injection of hardening materials (such as epoxy resins) that have very long hardening times (since in the mean time the tube is kept rigid and in position as a result of the overpressure in the gap), thus opening up a wide range of operating possibilities.

As has been mentioned above, the tubular apparatus according to the invention, unlike known tubings, which are closed at one of their ends or are closed at said end to carry out the operation of laying, advantageously comprises a sleeve, the internal passage of which, delimited by the inner wall of the three-dimensional fabric, is open at the ends, whereas just the gap enclosed between the inner wall and the outer wall of the three-dimensional fabric is closed at one end. Said aspect advantageously enables stiffening of the tubular apparatus according to the invention by controlling just the internal pressure of the gap, without having to regulate and control the pressure inside the passage in which the fluid flows, as is, instead, necessary for tubing closed at the end. This enables considerable simplification of the procedure of laying and makes it possible, before and during inflation of the tubing, to place devices for detection of the conditions of temperature, pressure, and presence of gases or liquids within the well.

Of course, without prejudice to the principle of the invention, the details of construction and the embodiments may vary widely with respect to what has been described and illustrated herein purely by way of example, without thereby departing from the scope of the present invention.

The cross section of the tube is preferably constant in shape and area, but there may be envisaged at least local variations of the section, for example, to allow joints to be made.

The wall of the tube is substantially a continuous sleeve made of fabric or interwoven fibres, even though there may be considered as included in the inventive idea also walls made of fabric that include elements or short stretches made of material different from the fabric, which, however, do not modify the structure of flexible tube including at least one gap developing in the axial direction. The tubular wall preferably constitutes an entire cylindrical surface, but in the same way it may be possible for segments of arc of the perimeter to be made in a different way, and likewise the gap or gaps may not extend along the entire perimeter of the wall.

The gap or gaps preferably develop throughout the axial length of the tube, or for the stretch of axial length of the tube that has to be stiffened via injection of the fluid. Said axial length may possibly be considered but for initial or terminal stretches, for example, stretches prearranged for application of flanges, and the gap basically develops in the stretches of tube in which said tube is to become a permanent installation.

The tubular wall 11 preferably forms an entire cylindrical surface. In the applications of the tubular apparatus, for example, as line, it is possible to include in the wall of the tubular apparatus cables for transmission of electric power and/or laser beams, and/or optical and/or electrical signals.

The invention claimed is:

1. A tubular apparatus for making rigid tubular structures, comprising a flexible cylindrical wall defining inside it a hollow passage, said tubular apparatus being suitable for being wound on a spool, and continuously laid for use, said apparatus being wherein said cylindrical wall comprises a fabric defining interwoven fibres and comprising inside it at least one gap, which develops in the axial direction of said cylindrical wall, said fabric defining by means of the respective interwoven fibres a three-dimensional structure comprising an inner wall and an outer wall, which delimit said at least one gap, and means suitable for operating under traction when within said at least one gap a pressurized fluid is present, injected for stiffening the tubular apparatus, said cylindrical wall comprising a first inner wall and a second outer wall of fabric, which are parallel, and said means for operating under traction comprising interconnection threads that connect said first inner wall to said second outer wall, wherein said first wall and second wall are impermeabilized.

2. The tubular apparatus according to claim 1, wherein said first, inner, wall and said second, outer, wall are layers of fabric comprising warp and weft and said interconnection threads are weft threads or, respectively, warp threads.

3. The tubular apparatus according to claim 1, wherein said cylindrical wall has a three-dimensional structure comprising a plurality of cells, which develop in an axial direction and identify said one or more gaps, walls of said cells functioning as said means suitable for operating under traction, said structure being in particular a honeycomb structure.

4. The tubular apparatus according to claim 1, wherein said wall comprises an impermeabilizing polymeric material.

5. The tubular apparatus according to claim 1, wherein said fabric of the cylindrical wall comprises aramide fibres or carbon fibres.

6. The tubular apparatus according to claim 1, wherein said at least one gap is filled with said fluid injected under pressure, said fluid being in particular a resin or a cement or other material that is able to solidify.

7. The tubular apparatus according to claim 1, wherein it comprises a plurality of concentric gaps, in particular two concentric gaps filled, respectively, with a resin and with its hardener and separated by a wall functionalized in such a way as to enable interchange of the fluids.

8. The tubular apparatus according to claim 1 wherein said wall comprises cables for the transmission of electric power and/or laser beams and/or optical and/or electrical signals.

9. The tubular apparatus according to claim 1, wherein it is comprised in a conduit for conveying fluids, in particular water.

10. The tubular apparatus according to claim 1, wherein it is comprised in a system for repairing damaged pipes.

11. The tubular apparatus according to claim 1, wherein it is comprised in a casing of a well.

12. A method for installing a flexible tubular apparatus for making rigid tubular structures, wherein the installation of a tubular apparatus according to claim 1.

13. The installation method according to claim 12, wherein placing said tubular apparatus in an installation site, and following upon said operation of placing said tubular apparatus injecting a fluid that is able to solidify in said one or more gaps.

* * * * *